Nov. 15, 1966  H. L. SMITH, JR  3,285,157
ROASTING AND HEATING APPARATUS
Original Filed Oct. 4, 1962  12 Sheets-Sheet 3
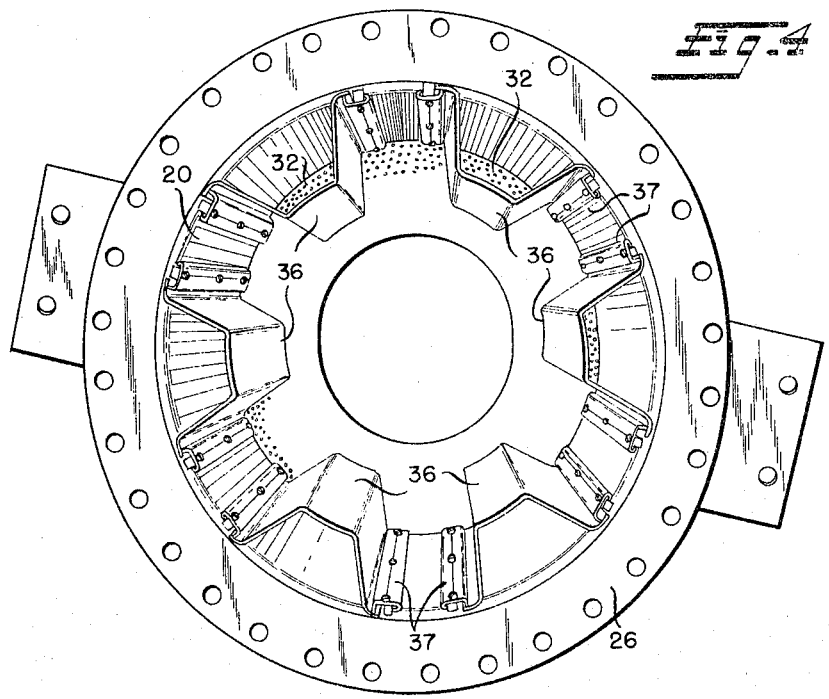
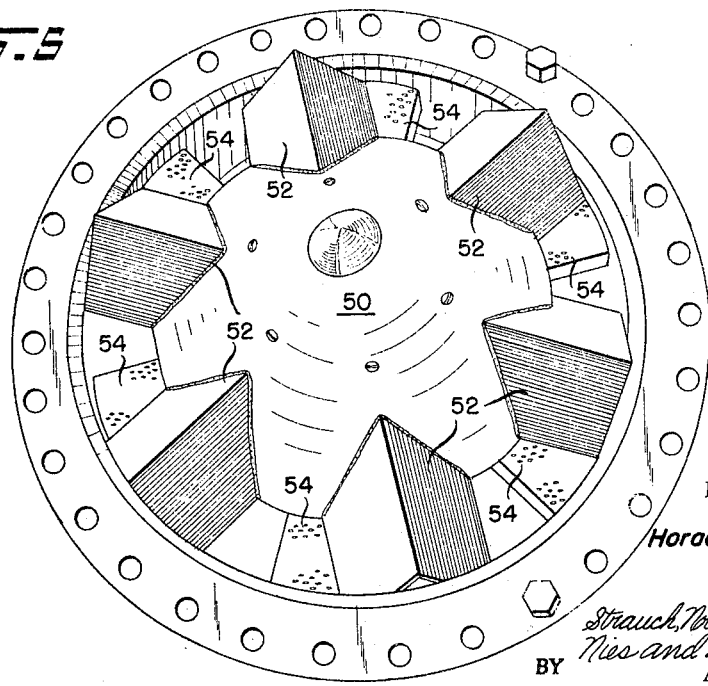
INVENTOR
HoraceL.Smith,Jr.
BY Strauch, Nolan, Neale, Nies and Bronaugh
ATTORNEYS

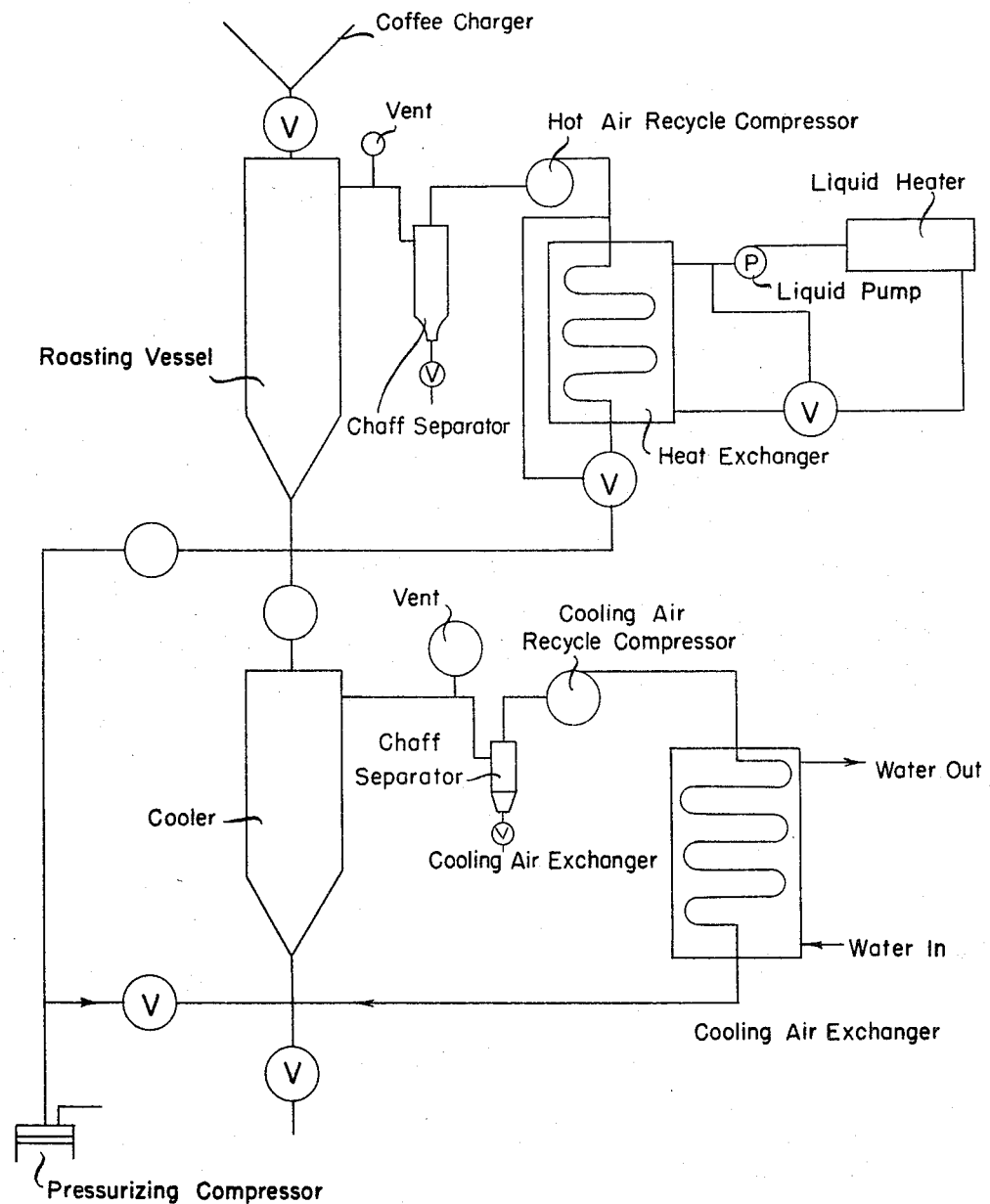

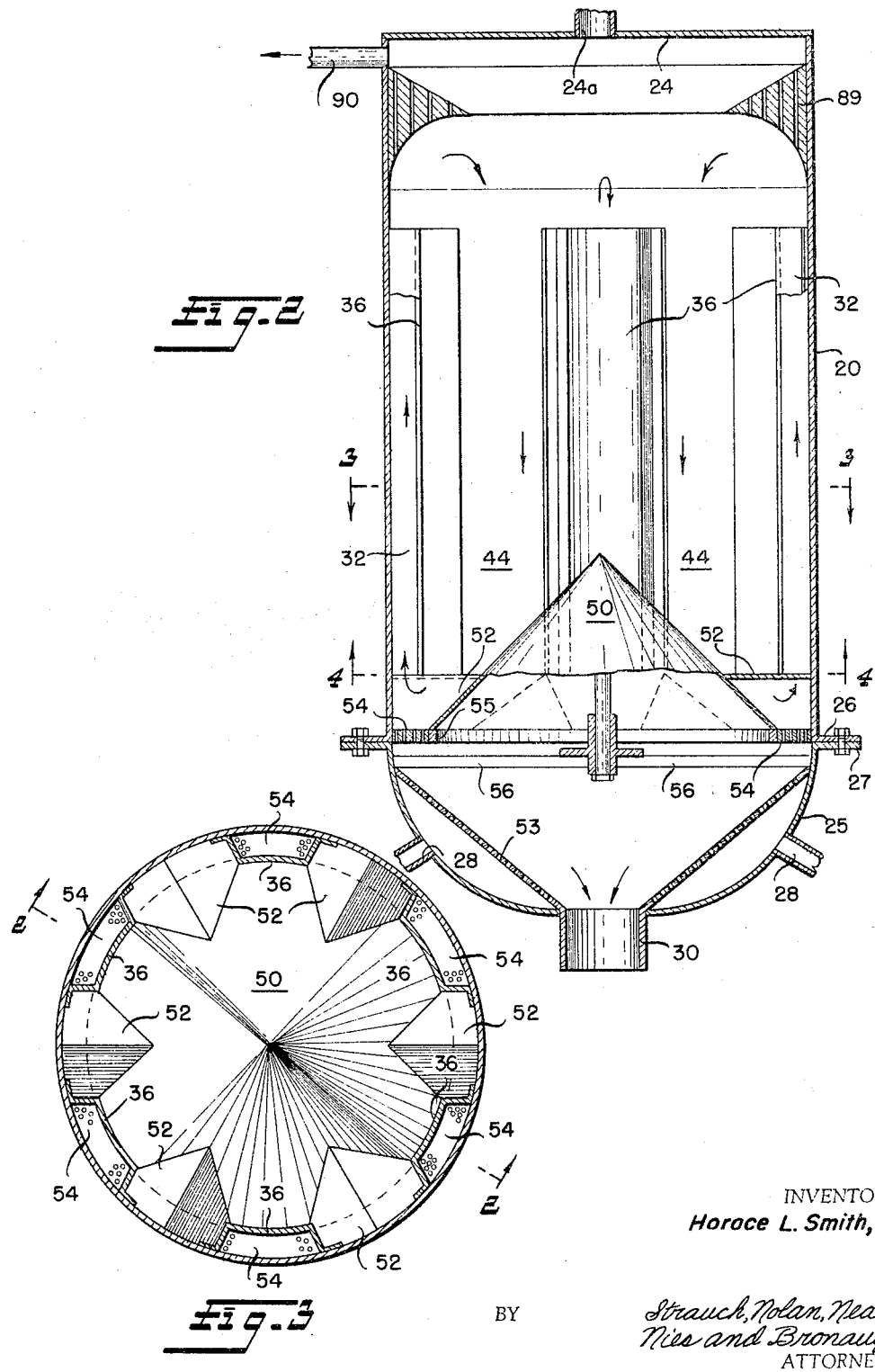

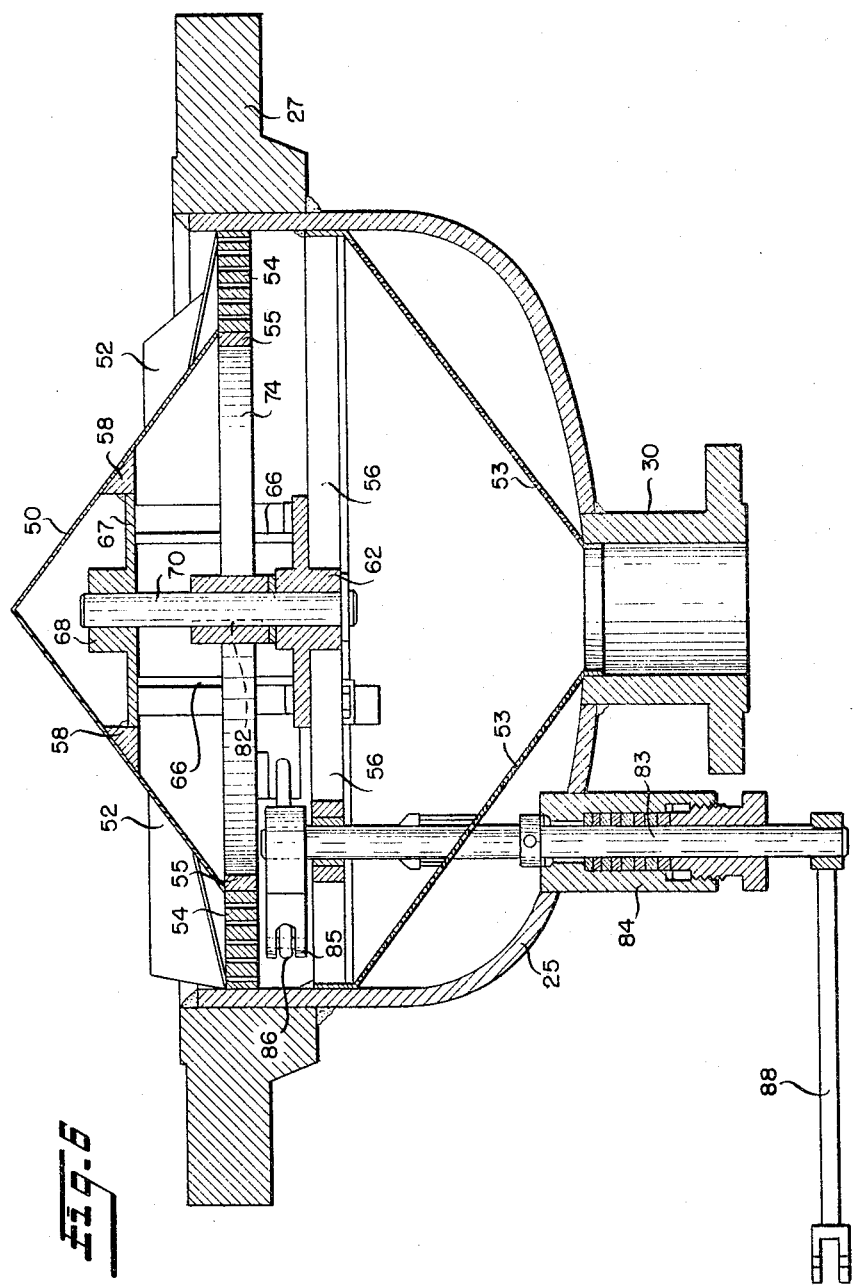

Nov. 15, 1966  H. L. SMITH, JR  3,285,157
ROASTING AND HEATING APPARATUS
Original Filed Oct. 4, 1962  12 Sheets-Sheet 5

INVENTOR
Horace L. Smith, Jr.

BY Strauch, Nolan, Neale,
Nies and Bronaugh
ATTORNEYS

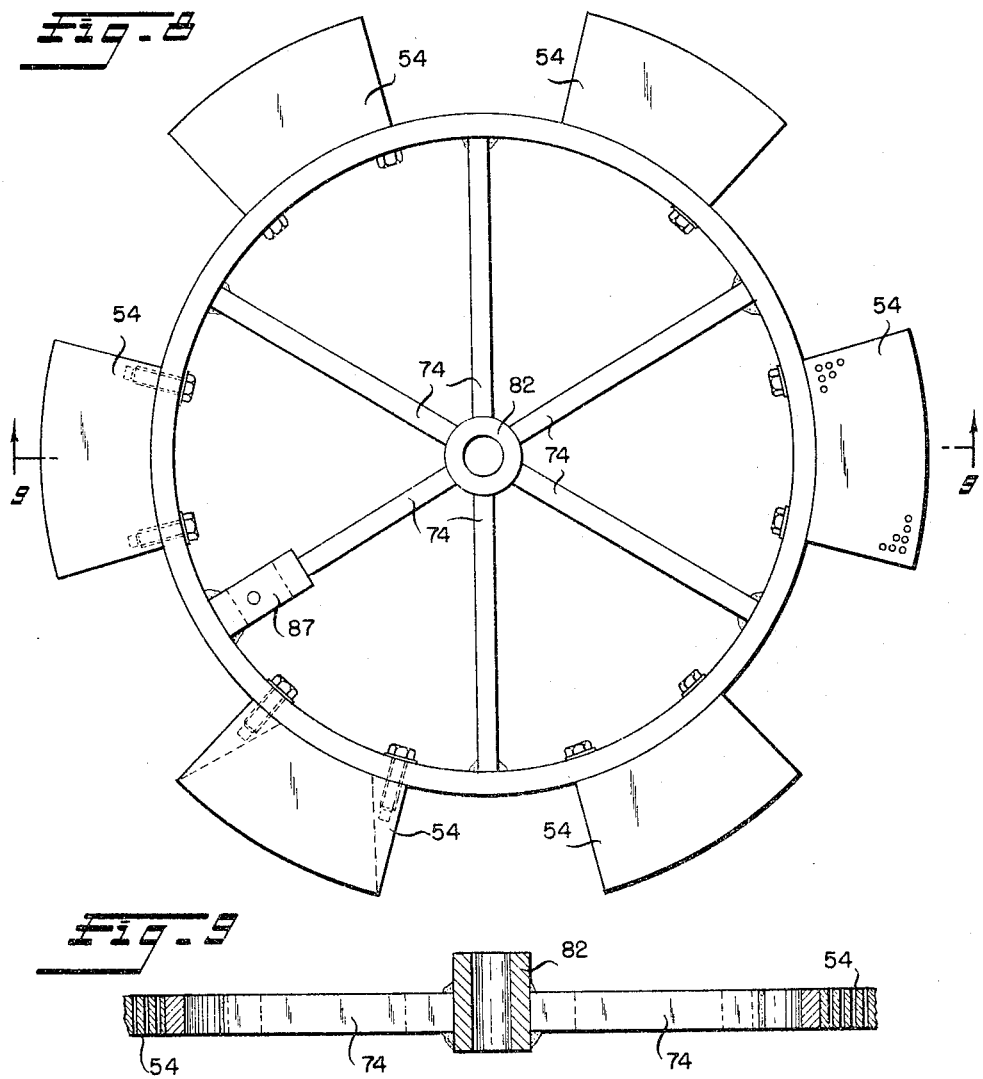

Nov. 15, 1966  H. L. SMITH, JR  3,285,157
ROASTING AND HEATING APPARATUS
Original Filed Oct. 4, 1962  12 Sheets-Sheet 7

INVENTOR
*Horace L. Smith, Jr.*

BY *Strauch, Nolan, Neale,
Nies and Bronaugh*
ATTORNEYS

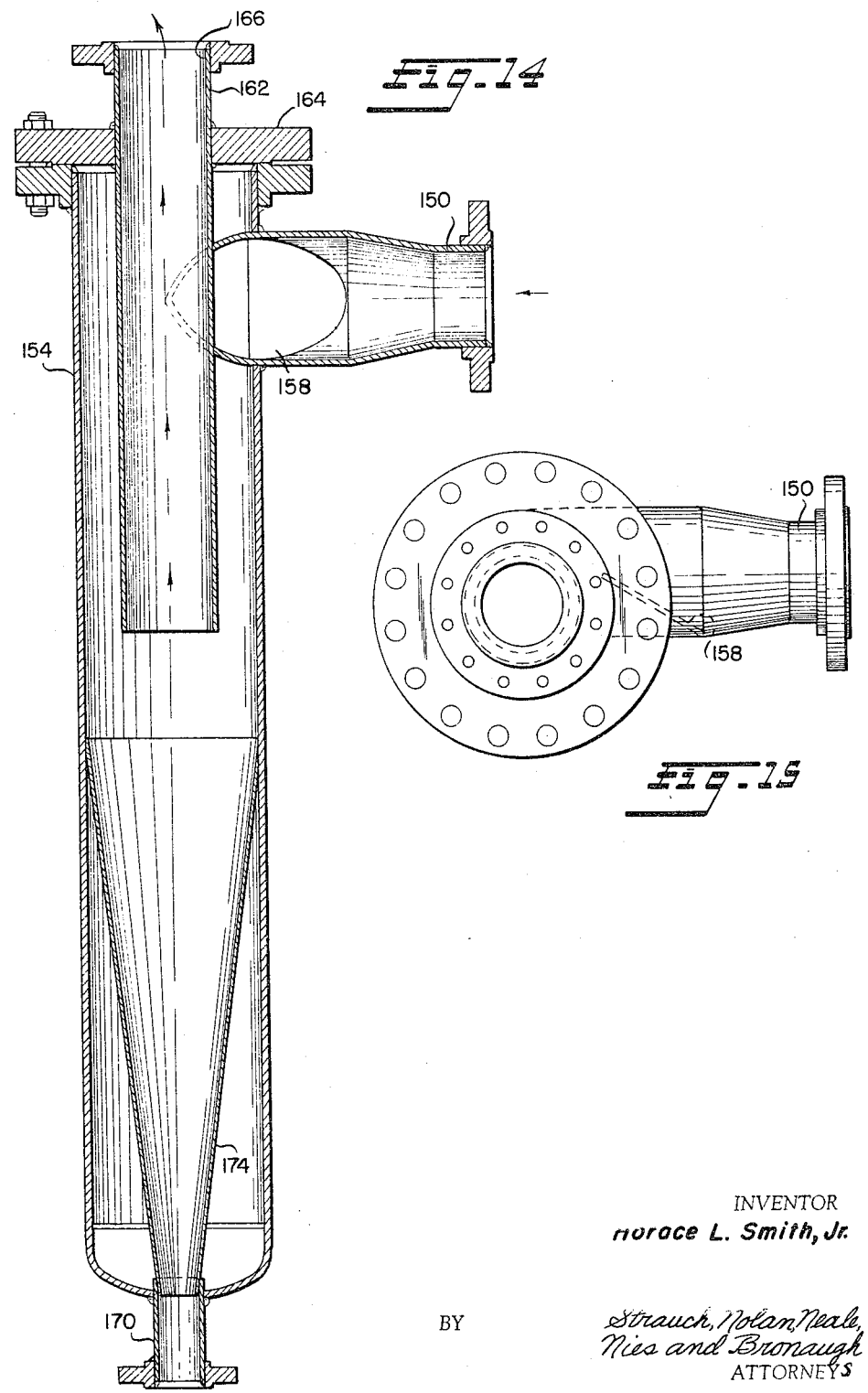

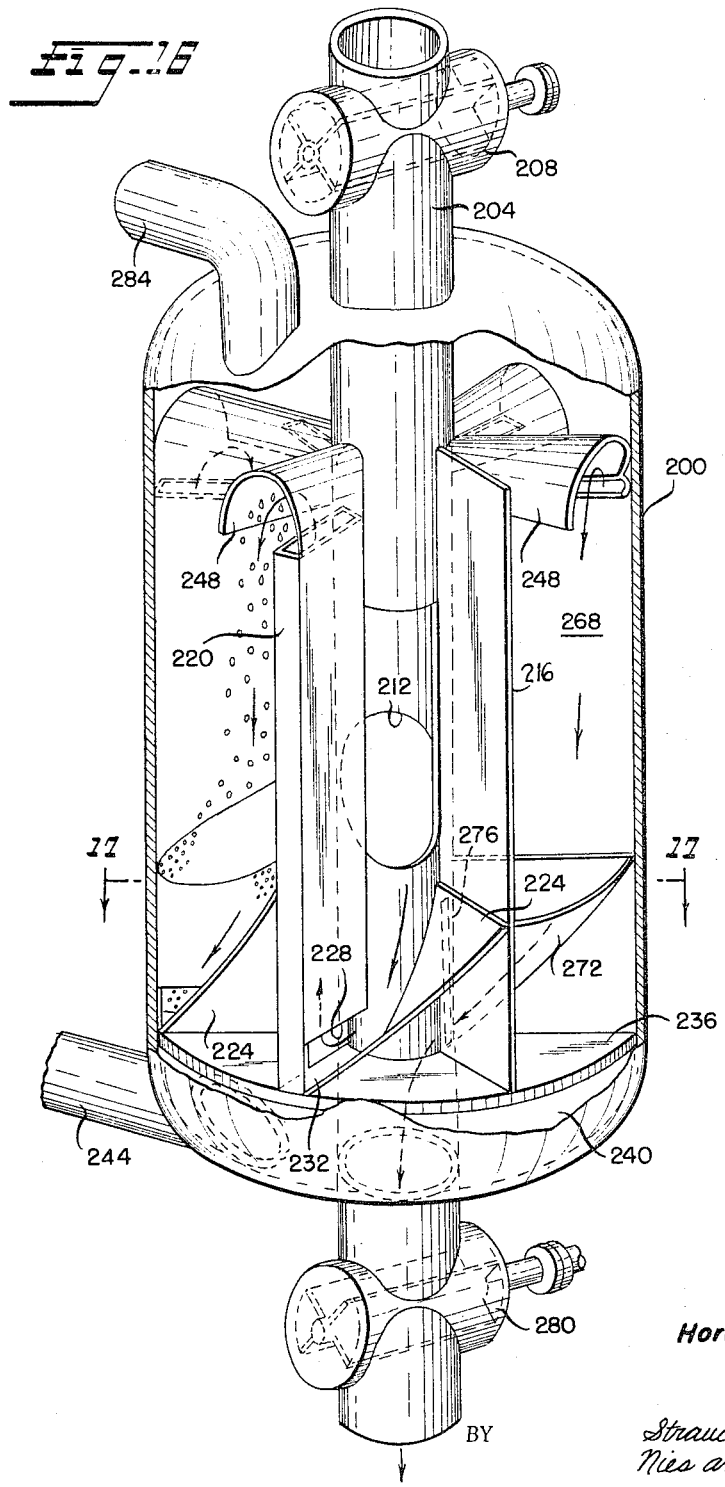

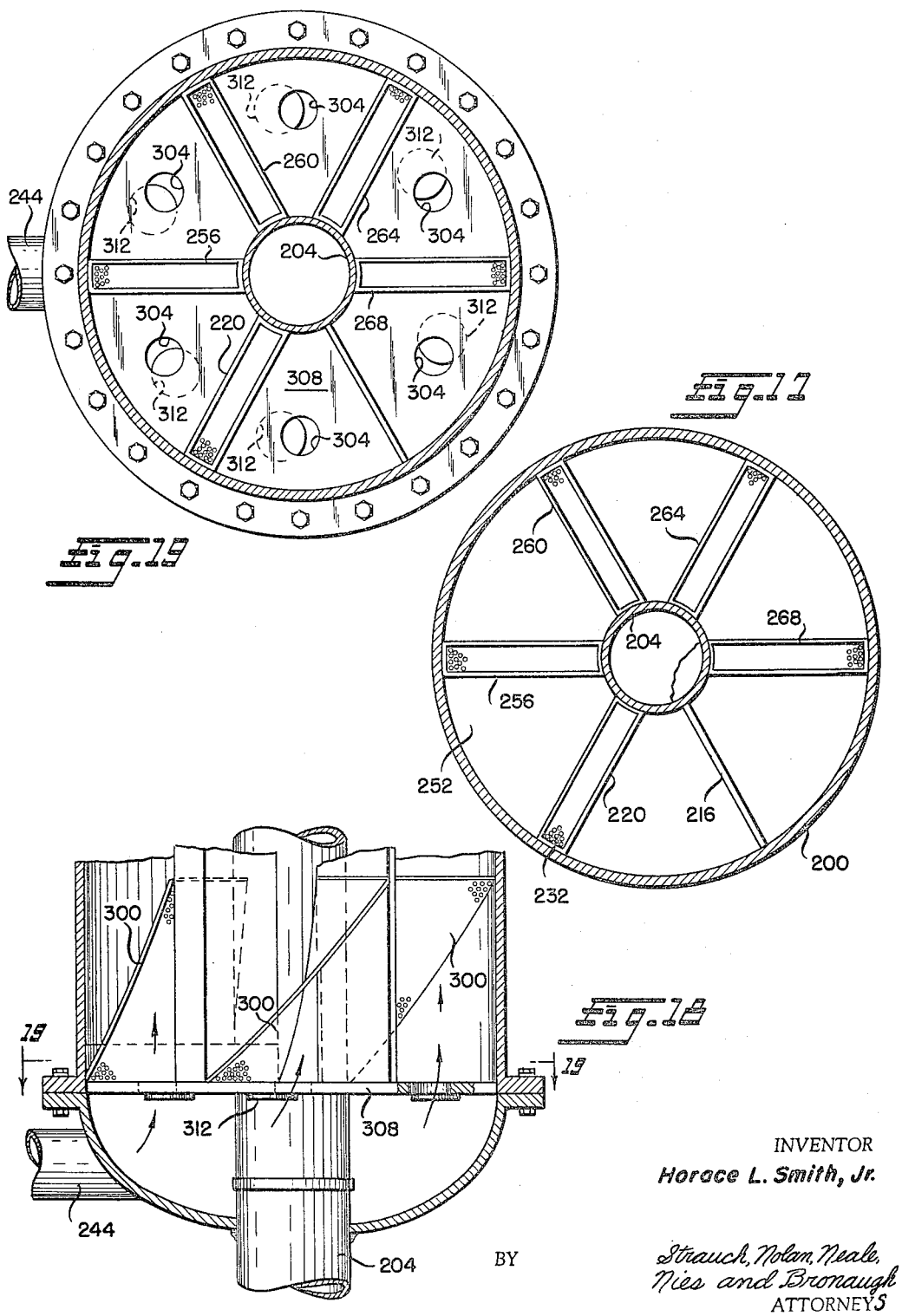

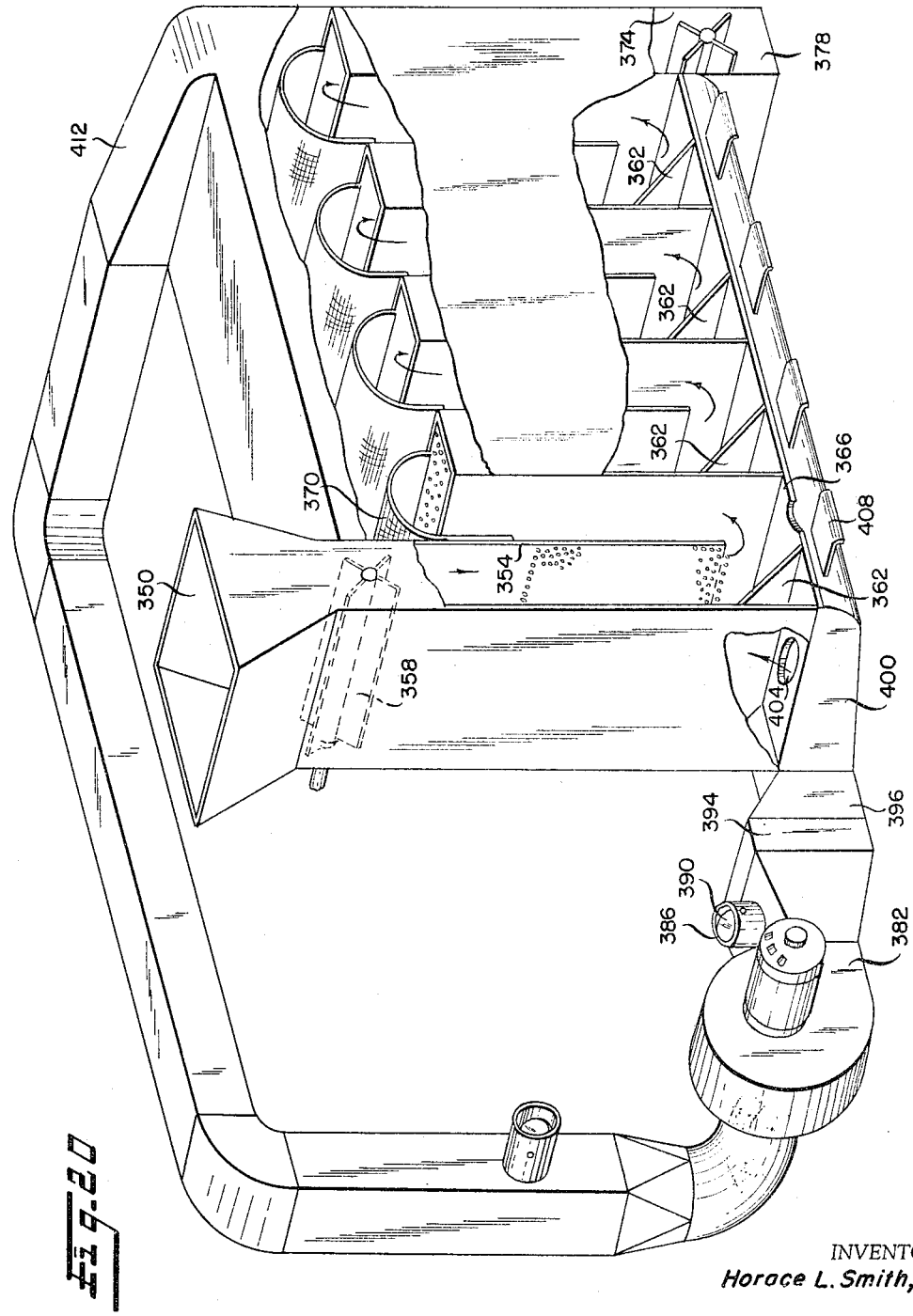

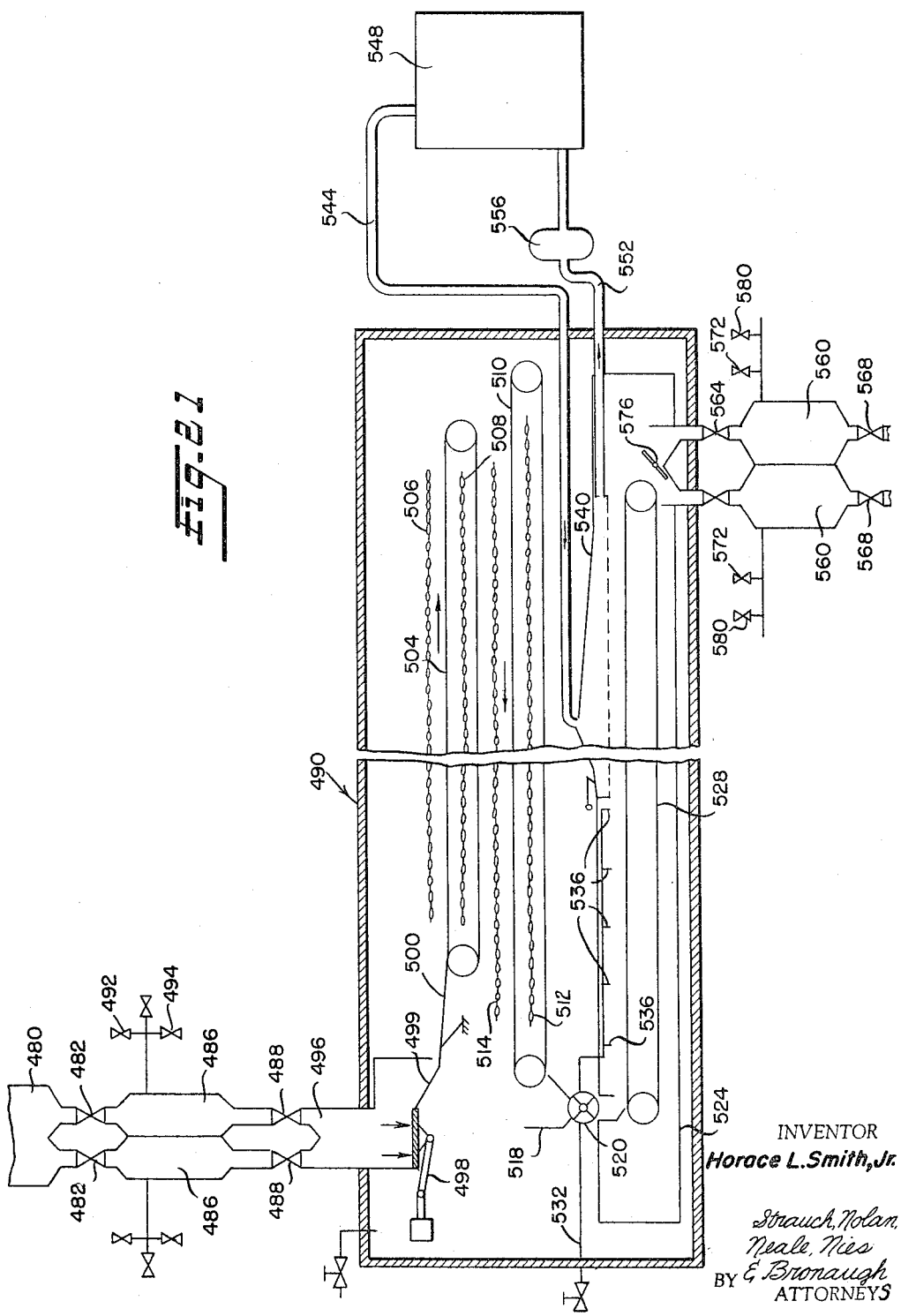

United States Patent Office 3,285,157
Patented Nov. 15, 1966

3,285,157
ROASTING AND HEATING APPARATUS
Horace L. Smith, Jr., Richmond, Va., assignor to Hupp Corporation, Cleveland, Ohio, a corporation of Virginia
Original application Oct. 4, 1962, Ser. No. 228,429, now Patent No. 3,189,460, dated June 15, 1965. Divided and this application May 10, 1965, Ser. No. 454,425
8 Claims. (Cl. 99—236)

This application is a division of application No. 228,429 filed October 4, 1962, now Patent No. 3,189,460, for Roasting And Heating Methods.

This invention relates to improvements in treating granular materials for use in the preparation of food or drink and, more particularly, to novel apparatus for roasting coffee, coffee substitutes, and the like.

Coffee is a widely used item of commerce, being consumed in large quantities, primarily in the form of a brew, in this and many other countries. Much technology has therefore evolved in the preparation of coffee and coffee substitutes, particularly in the field of coffee roasting. However, the characteristics of brewed coffee as affected by roasting are as yet not fully understood although highly technical studies have been made to determine the development of coffee bitterness and loss of flavor during roasting. Reports of such studies have, among others, included data concerning roasting effects on the following coffee characteristics: color, total water soluble solids content, sugars, chlorogenic acid, volume resistance of beans to crushing on roasting as influenced by roast finishing temperature, swelling, breaking strength of roasted coffee beans, and the chemical compositions of various coffee brews.

Of the foregoing factors, weight loss due to volatilization of moisture and other volatile constituents and destruction of organic matter during roasting are probably considered the most important. Green coffee is known to contain volatile materials which constitute part of the roasting weight loss, the aromatic volatiles being generally recognized as contributing to the flavor and aroma of the coffee brew. The initial moisture in green coffee is variable depending on the processing, season and conditions of storage. The higher the initial moisture in green coffee, the greater the weight loss for a given roast. A weight loss of 16–17% for a coffee of initial moisture of 9% is considered normal for a conventional medium coffee roast. Destruction of organic matter is usually responsible for about 6–7% of the total loss in weight, and moisture loss in general constitutes the remainder of the total roasting loss.

The speed and temperatures of roasting affect the resulting characteristics of the beans. Relatively long roasting periods may result in localized burning, excessive evaporation of volatiles resulting in loss of flavor or undesirable dryness, and may result in undesirable chemical reactions. Roasting time and temperature also bear directly on the economics of the roasting operation and are therefore very important considerations.

I have discovered that the properties of roasted coffee and coffee substitutes and the speed and economics of roasting are materially improved by handling the beans and grains during roasting so that they are what I have termed "individually" roasted. By this I mean that all of the beans are exposed to substantially the same conditions during roasting, as for example by roasting beans or grains in single grain layers, or by rapid turnover of the mass of beans in the roasting zone. In the preferred rapid turnover coffee roasting embodiment of my present invention each coffee bean is maintained substantially free from contact with surfaces of the roasting apparatus in the roasting zone and other beans while being subjected to roasting temperatures according to their individual characteristics irrespective of, for example, the relative heat absorptivities and other differing properties of the other beans being roasted.

Individual roasting or heat treating is preferably achieved by circulating the beans or granular particles in high velocity gas through a primary roasting zone whereas, in other embodiments of this invention the beans may be conveyed in a layer substantially one bean thick on a belt carrier through one or more heating zones and, in either case, with the roasting zones preferably maintained under pressure. In my preferred method, the beans or other particles are passed through alternate primary heating and secondary heating and storage zones. In a primary heating zone high velocity, heated roasting gas conveys the beans or granular particles to a secondary zone where they reside in a process dwell while the heat rapidly applied to the bean outer surface is conducted toward the bean or particle center. The beans are then introduced into a primary heating zone from the secondary zone and the cycle repeated as many times as needed to effect the roasting or other heat treatment desired. By establishing separate zones the depth or amount of beans in storage will have no effect on the quantity or pressure of gas necessary to carry out the roasting as occurs in prior fluidized bed roasters, for example, where gas is circulated directly into and through a mass of beans and a pressure drop exists between the top and bottom of the bean mass.

The relatively high velocity of the gas traveling in the primary roasting zone of the preferred embodiment of my invention and the rate at which the beans or particles are introduced into the gas are such that the beans are conveyed individually through the roasting or heating zone rather than in a more or less collective mass, thus enabling much more complete roasting of the individual beans in less time than is required in the prior roasting process.

The principles of this invention apply to both single batch, or non-continuous, and continuous roasting apparatus.

The gas used in any of my processes is preferably air although nitrogen, carbon dioxide or other inert gases, water vapor, water vapor mixed with air, or water vapor mixed with inert gas may be utilized as preferred to vary the quality of the roasted product.

To offset the effects of weight and flavor loss during roasting one previously known roasting method attempted to collect the volatalized elements and recharge the roasted beans therewith as they cooled. However, the volatilized elements are subject to oxidation and other deteriorative attack, and therefore not restorable in their orginal condition to the detriment of the resulting coffee quality.

In another prior art process the green coffee is dehydrated in the absence of air to effect rapid liberation of moisture from the beans followed by roasting in a nonoxidizing superatmoshperic environment in a closed roasting vessel. Initial sub-atmospheric dehydration of the coffee beans and artificial aging at 25–28 inches vacuum and at 140–150° F. in the presence of a moisture absorbent results in reduction of 8–10% bean weight. The dehydrated beans are then removed from the drying vessel and placed in a closed roasting chamber at 405–410° F. in an atmosphere of $CO_2$ at 200 p.s.i. and upward. After the first 10 minutes the coffee temperature drops to about 385° F. and then returns to the higher chamber temperature. Roasting is completed in about 21–22 minutes. The maximum roasting temperature of 410° F. is set to avoid scorching the beans. My improved roasting processes do not include a dehydration step, and in the preferred embodiment of my apparatus the beans are recirculated successively in a relatively high velocity stream of roasting gas until roasted to the desired condition. As compared to this process in which roasting time is about 21–22 minutes, the roasting time of my invention is much shorter. For example, in my preferred embodiment roasting times are of the order of 1½–2½ minutes with a much lower weight loss and considerable product improvement.

Another prior art process employs a fluidized bed roasting process in which it is proposed to maintain the beans in a state of suspension in gas introduced at the bottom and passed upwardly through the roasting chamber. The conventional passing of gas such as air over and through layers of material to be roasted at high temperatures will not uniformly heat the beans, the surfaces of conventional roasting chambers burn and severely damage contacting particles, and prior recycling and reheating of the gas stream used for roasting is a substanial disadvantage in that aromatic substances, essential oils, and other materials carried away with the roasting gas stream will, when reheated, form objectionable contaminants of the material being heated. The prior art process described above maintains the roasting zone surfaces at a temperature not in excess of the roasting temperature to prevent burning, suspends the beans in gas, and continuously heats new air before passing it through the roasting zone.

My improved roasting methods differ from other known processes in that I roast the beans substantially individually as compared to roasting of the beans in masses. In the preferred embodiments of my apparatus the major roasting is effected in a high velocity heated stream of roasting gas in which the individual beans are moved rapidly and repeatedly through primary roasting zones and relatively slowly through a secondary storage and heat transfer zone with some incidental roasting unitl the beans are substantially individually uniformly roasted. In roasting by the method with the suspending gas, the lower beans contacted by the gas first absorb more heat initially than do the top beans, while roasting with heating elements located adjacent the bean mass will result in local overheating of beans in other areas as no circulation of the beans is provided, other than by action of the comparatively dormant air air suspension. Also, in my preferred improved roasting apparatus, the temperature of the primary roasting heat source can be substantially above the material roasting temperatures without injury to it as it moves rapidly through the roasting zone. And by roasting under controlled pressures I control the evolution of volatiles and weight loss, improve the quality and flavor of the roasted product, and can recirculate used heated gases reasonably without substantial product injury and with appreciable economic saving of roasting heat.

It is therefore a primary object of the present invention to provide novel roasting apparatus especially adapted for roasting coffee, beans, grass cereal grains and substantially uniform discrete granular particles in which the particles are individually heated to roasting temperature and substantially individually roasted either in individual batches or continuously.

It is also a primary object of this invention to provide novel apparatus for roasting coffee and the like primarily in a high velocity stream of gas, and preferably in a pressurized heating zone, whereby roasting may be effected in a relatively short period of time if desired with improved flavor and quality of the roasted beans.

Another object is to provide improved apparatus for roasting particulate material in a single layer in a manner to produce substantially individually roasted particles.

Other objects are to provide novel pressurized roasting apparatus for the production of puffed or expanded roasted particles such, for example, as coffee beans, coffee substitute grains and the like, which utilize as a heating media fluids such, for example, as inert gas, steam, air, or a mixture thereof; in which direct exposure to radiant energy effects substantially uniform heating of the beans or particles by conveying them through irradiating zones for example as radiation transmissive woven wire belts; in which roasting of coffee beans or particles may be effected in about 1¼ to 3 minutes depending on the operating temperature and pressure; in which pressurized roasted particles are cooled while under substantially the roasting pressure to prevent loss of volatiles due to the latent heat stored in them during roasting; and wherein pressure may be maintained at from atmospheric pressures up to 300 p.s.i. gauge or more, and for coffee roasting is preferably maintained between approximately 150–300 p.s.i. gauge temperatures of the order of 350–450° F.

It is still another object of this invention to provide novel roasting apparatus and systems which preferably may be pressurized; in which one or more high velocity gas streams may be established in a roasting zone; and in which coffee beans or other particles to be roasted may be spread in a layer substantially one particle thick and passed through a heated roasting zone in a manner to provide uniform roasting.

A further object is to provide novel roasting apparatus with means for cooling a roasted product, preferably under a pressure at or near the roasting zone pressure.

A still further object is to provide improved means to puff or expand shrunken pressure roasted, coffee beans, grain and the like without substantial volatile and weight loss.

Other objects and advantages will be pointed out and will become apparent to those skilled in this art from the appended claims and following detailed description of the best modes of carrying out my invention, and examples and modifications thereof, taken in connection with the accompanying drawings wherein:

FIGURE 2 is a front elevation view in section of the preferred construction of a roasting vessel taken along line 2—2 of FIGURE 3;

FIGURE 3 is a sectional plan view taken along line 3—3 of FIGURE 2;

FIGURE 4 is a perspective view of the upper section of the roasting vessel illustrated in FIGURE 2 looking upwardly from line 4—4 of FIGURE 2;

FIGURE 5 is a perspective view of the conical member and associated parts mounted in the lower section of the roasting vessel illustrated in FIGURE 2;

FIGURE 6 is a front elevation view center section of the lower portion of the preferred roasting vessel shown in FIGURE 2, illustrating details of the apparatus adapted for discharging the granular material after being heat treated;

FIGURES 7A and 7B are perspective views of apparatus embodying a rotatable nozzle block assembly positioned preferably in the lower section of the roasting vessel (illustrated in FIGURE 2 and more specifically illustrated in FIGURE 6) for discharging the granular material from the vessel;

FIGURE 8 is a plan view of a rotatable nozzle block assembly adapted to be secured in the lower half of the roasting vessel and embodied in the apparatus illustrated in FIGURES 7A and 7B;

FIGURE 9 is a section view of the nozzle assembly illustrated in FIGURE 8, taken along line 9—9 of the latter figure;

FIGURE 10 is a detailed plan view of a nozzle block constructed in accordance with the present invention;

FIGURE 11 is an enlarged fragmentary section view, in elevation, of the nozzle block of FIGURE 10;

FIGURE 14 is a front elevation view in section of a novel chaff separator, taken through the center thereof;

FIGURE 15 is a plan view of the chaff separator of FIGURE 14;

FIGURE 16 is a perspective view partly in section of a novel continuous granular material heat treating apparatus embodying certain principles of the present invention;

FIGURE 17 is a section view of the apparatus illustrated in FIGURE 16 taken along line 17—17 of FIGURE 16;

FIGURE 18 is a front elevation view taken in section of the lower half of another continuous granular material heat treating apparatus which constitutes an embodiment of the present invention;

FIGURE 19 is a section view of the apparatus illustrated in FIGURE 18 taken along line 19—19 of the latter figure;

FIGURE 20 is a perspective view partly in section of another embodiment of the present invention adapted for continuous heat treating of granular material; and FIGURE 21 is a diagrammatic front elevation of a further embodiment of the present invention.

By way of example, the best mode of roasting coffee in accordance with my invention may be generally summarized in steps as follows: (a) introducing coffee into a roasting apparatus, (b) establishing zones of relatively high velocity air heated to about 400–420° F. in the roasting apparatus and circulating and heating the coffee beans to a roasting temperature in such zones, preferably under pressure of from 150–300 p.s.i. depending on the results desired, and (c) cooling the coffee beans under approximately the same pressure, preferably in another vessel, but in the roasting apparatus if desired.

Figure 1B:
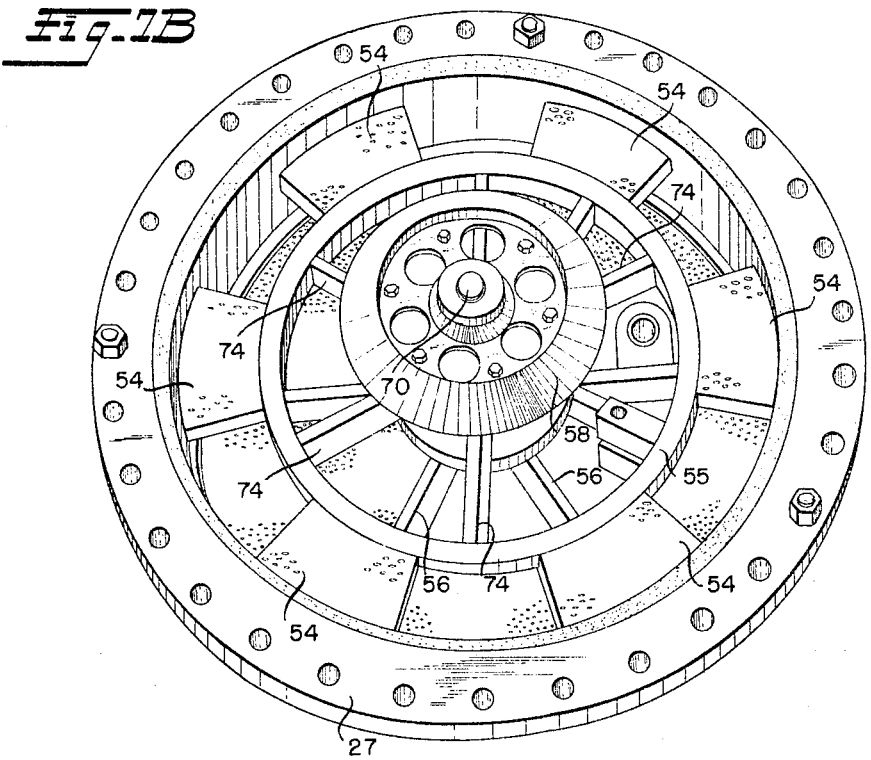
FIGURE 1 is a diagrammatic flow sheet of the preferred apparatus of roasting coffee in accordance with the principles of the present invention relating to heat treating granular materials.

FIGURE 1 diagrammatically illustrates a preferred system for carrying out my coffee roasting. In this figure the valves are indicated by the letter V and the remaining equipment is labelled. As noted on the drawing, the coffee is initially contained in a coffee charger, from which it is delivered through a valve to a roasting vessel. Since, in accordance with the preferred method of roasting of this invention, the roasting vessel will be pressurized, the beans may be introduced through a suitable pressure lock or pressurized feed valve to maintain the pressure in the roasting vessel. However, this is not necessary since the first air contacting a new batch will be relatively cooler than subsequent gas; and, by the time gas heated to roasting temperature is circulating, the desired roasting pressure may be built up. Air, heated in a suitable heat exchanger through which hot liquid is circulated from a liquid heater, is introduced preferably (although not necessarily) under pressure maintained by a pressurizing compressor into the bottom of the roasting vessel. Hot air exhausted from the roasting vessel passes through a chaff separator and a re-cycle compressor into the hot air system with partial bleed off as more fully hereinafter set forth. As will be described in detail, streams of the heated air flowing at a relatively high velocity are established; and the coffee beans are circulated and heated to roasting temperatures therein.

The air temperature may be controlled by regulating the operating temperature of the heat exchange liquid. A heat exchanger bypass line is provided between the roasting vessel and hot air re-cycle compressor so that the temperature of the air may be conveniently controlled if desired by a means other than the temperature of the heated liquid. Heat exchange liquid in the heat exchanger is preferably a high boiling point hydrocarbon liquid such as Aroclor 1248 which may be used at temperatures up to about 600° F. or other suitable high boiling point liquids capable of withstanding relatively high temperatures (700° F. or higher) without breaking down.

After roasting, the coffee beans are discharged through a suitable valve to a cooler which is also preferably maintained under the same pressure as the roasting vessel. Air or other suitable medium is passed through a cooling exchanger which is cooled preferably by water. The air is forced under pressure into and through the cooler into heat exchange relationship with the coffee and taken off the top and re-cycled again by a cooling air re-cycle compressor. Operation of the cooling phase may be carried out in any suitable manner since its mode of operation is not critical. As indicated in FIGURE 1, it is preferable to include a chaff separator in the cooling system similar to the separator illustrated in the heating system and described below in connection with FIGURES 14 and 15. However, in accordance with this invention, a particularly good method of cooling, and a novel pressure reduction step during cooling will be described below.

The preferred roasting apparatus for carrying out my method is illustrated in FIGURES 2 and 3. A roasting vessel is comprised of a cylindrical wall 20 closed at one end by lid 24 having a suitable inlet opening 24a through which the beans are introduced into the vessel and, at the other end, by a rounded bottom portion 25 fixed thereto by bolting or otherwise securing flanges 26 and 27 together. Heated air inlets 28 are provided on opposite side of the roaster while a product outlet 30 is located in the central bottom portion.

Elongated channels 32 are formed by vertical partitions 36 spaced around the inner side of roaster wall 20. FIGURE 4, a perspective view from the bottom of channels 32, illustrates the preferred construction and relationship of partitions 36. Clamps 37, or other suitable means, hold the partitions in place.

The remainder of the interior space of cylinder 20 not enclosed by partitions 36 constitutes a storage and inner heating zone 44 into which the beans are initially introduced and stored prior to heating and subsequently returned after circulation through and exposure to the high velocity heated air in channels 32 to absorb heat applied to the bean surfaces and to await additional circulation in the vertical channels.

Roasting is carried out by circulating heated air upwardly through channels 32 while the beans are continuously circulated through the channels and storage zone 44. A complete cycle will require only a few seconds due to the velocity of the air in channels 32. Practically all heat will be applied to the beans in channels 32. However, as the beans are returned from the channels to and collected in zone 44 and await re-introduction in channels 32, a period of dwell in the direct heating phase occurs during which heat taken up by the bean surface layers in channels 32 will be conducted toward the center of the beans. Such a dwell period thereby prevents excessive heating and burning of the bean surface layers.

A conical member 50, spaced from and concentric with the outer wall 20 is fixed in the bottom of inner heating zone 44 and together with the outer wall 20 of the vessel, the member 50 forms a roasting chamber, the lower portion of said chamber being annular and having a substantially vertical axis, the bottom end portion of which is closed by means to be described. As best shown in FIGURES 3 and 5, A-roof deflectors 52 for guiding the coffee laterally into channels 32 as it passes downwardly in central storage zone 44 extend from the upper surface of floor cone 50 between each pair of channels 32 about the inner side of roaster wall 20 and have downwardly diverging roof shaped surfaces directed toward the adjacent channels 32.

A perforated, conical plate 53 (FIGURE 2), attached to the bottom of cylindrical wall 20 and connected to outlet 30, dissipates the jetting effect of gas entering directly through inlets 28 so that the gas entering each of the high speed channels 32 will be at substantially the same velocity and pressure. To regulate the velocity and flow pattern of air entering channels 32, a nozzle assembly (FIGURE 5–8) comprised of a plurality of nozzle blocks 54 is attached to an annular nozzle ring 55, suspended from floor cone 50 and supported by mounting legs 56 engaging the roaster wall 20. During roasting, the nozzle ring is positioned such that each nozzle block 54 is directly under a channel 32. Air entering the latter from below must therefore pass through a nozzle block. To discharge the beans from the roaster, ring 55 is adapted to rotate circumferentially so that the nozzle blocks are located beneath A-roof deflectors 52 and coffee in inner heating zone 44 or in channels 32 may flow onto perforated plate 53 and through outlet 30. In FIGURE 5, the nozzle assembly is shown rotated halfway between roasting and discharge positions.

Figure 7A:
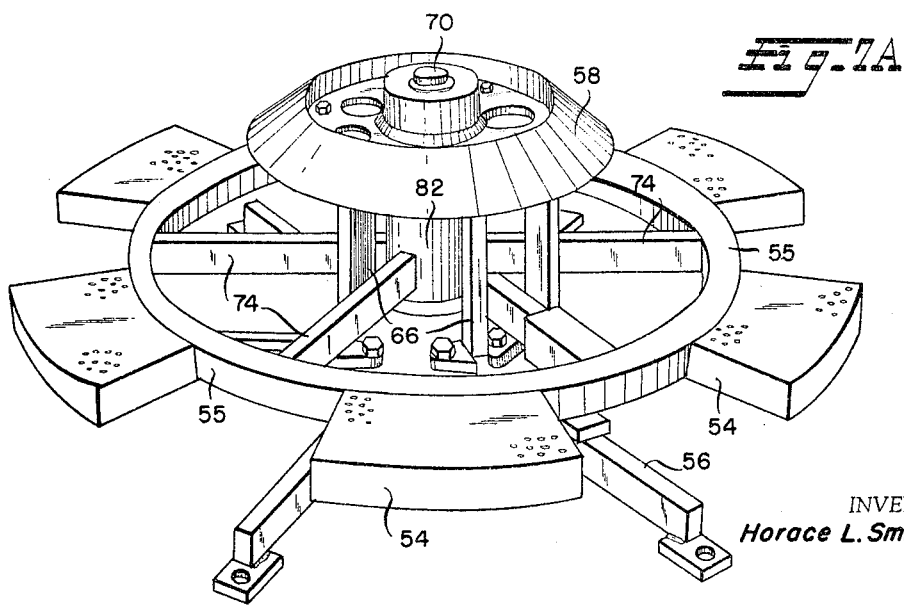

Details of the nozzle assembly and nozzle rotating mechanism are illustrated in FIGURES 6, 7A, and 7B. An upper frustoconical shaped member 58 abuts, and is secured to, the bottom surface of floor cone 50 as by bolts or other suitable means. A plurality of support legs 56 are secured to the inner vessel wall and are centrally joined at a hub 62. Vertical spaced columns 66 connect a central perforated plate 67 in cone 50 and hub 62. A rotatable shaft 70 is journalled in a central core section 68 in cone 50, and in hub 62, and carries a nozzle plate spider of wagon wheel configuration illustrated in detail in FIGURES 8 and 9, comprised of spider arms 74 which interconnect rim 55 and attached nozzle blocks 54, with spider hub 82 keyed on shaft 70. Rotation of the nozzle plate spider therefore affects placement of nozzle blocks 54 as desired.

The mechanism for rotating the spider assembly (FIGURE 6) is comprised of a shaft 83 journalled in a pressure tight gland 84 in the bottom portion 25 of the roaster body. A pair of pivotally connected links 85 and 86 interconnect sleeve 87 on one of the spider arms and shaft 83 whereby rotation of the shaft, as by means of operating lever 88, will effect rotation of the spider arms 74 and nozzle blocks 54. Spider arms 74 are positively stopped by suitable stationary adjustable stops (not shown) preferably fixed to lower hub 62 or support legs 56, at either the discharge or roasting position, as they are rotated back and forth. Rapid movement of the nozzle assembly may therefore be effected without special care being taken to stop the plate.

To operate the roaster, coffee beans are introduced into inner heating zone 44 through inlet 24a in lid 24 for example. High pressure air or other heated gas is then forced through inlets 28 and circulated through perforated, conical plate 53 and nozzle blocks 54 into vertical channels 32. The beans flow between the bottom of channel partition 36 and cone 50, as shown by the arrows in FIGURE 2, into the stream of rapidly flowing gas where the beans are heated to roasting temperature. The shape of cone 50 and the tapered walls of A-roof deflectors 52 is such that the beans are directed towards the openings between partitions 36 and cone 50.

As the beans pass out of the upper end of channels 32, they engage a perforated annular deflector 89 and are deflected, as indicated by arrows in FIGURE 2, into the inner heating zone 44 where a dwell in the roasting process occurs while the beans await re-introduction into vertical channels 32. The high pressure air emerging from the top of the channels in part enters a highly turbulent zone in the center of the roaster above central heating zone 44 and in part passes through the perforations in deflector 89. About 35–40% perforation in the deflector is preferred. After passing through or around deflector 89, the air passes out of the roaster through outlet 90 to a chaff separator (illustrated in detail below in FIGURES 14 and 15) and then returned directly through a heating member into inlets 28. Volatiles need not be removed or added to the recirculating gas since the amount taken off during roasting under pressure will be very slight.

The preferred nozzle blocks 54 are illustrated in detail in FIGURES 10 and 11. While many nozzle patterns, sizes, and designs may be used, it is preferred to construct them so that the coffee beans may be transported through channels 32 with a minimum of air supply with the air traveling at a relatively higher velocity than the beans. Air moving over the bean surfaces scours the cool surface film on the beans and effects a highly efficient heat transfer.

As shown in FIGURE 11, each individual nozzle is preferably one inch long and tapered upwardly in cross section. The bottom or inlet diameter is preferably .187 inch and countersunk 82° to .250 inch diameter to avoid a vena contracta of the emerging air.

The particular pattern of nozzles in each nozzle block 54 has been found to be particularly effective in receiving the beans as they are metered down from central heating zone 44 and raising the beans up through channels 32 with a minimum amount of air required to effect such transportation.

The temperature of the surfaces of roaster channels 32 in contact with the coffee is of negligible moment from the standpoint of causing excessive burn or overroasting of the coffee since the beans pass through the storage zone in a few seconds. The temperature of the surface of partitions 36 facing central zone 44 is about the average temperature of the coffee.

Optimum roasting conditions are normally 1½–3 minutes under a pressure of between 150 and 300 p.s.i.g., or greater, and temperature in the order of 350° F.–500° F. The most preferred conditions are: gas temperature 400° F.–420° F., pressure 300 p.s.i.g. (although good results are obtainable at 150 p.s.i. also), and the size of channels 32 and inlets 28 such that the gas flow therein under the above conditions is at about 600 feet per minute. The gas speed, temperature, and pressure may of course be varied according to the speed of the roast desired and to compensate for variations in types of beans or other products desired to be roasted.

By circulating the beans from the central storage and heating zone 44 into the high velocity channels, a rapid turnover of the beans will occur (about 6 seconds per cycle under the aforesaid preferred conditions); and, since most of the roasting is carried out in channels 32, individual roasting of the beans is achieved, and the principle of a fluidized bed in which gases non-uniformly heat a mass of more or less stagnant beans is avoided. In the fluidized bed processes a very serious disadvantage is that the air pressure necessary to overcome the static pressure of the beans will vary according to the depth of beans in the roasting vessel. However, by passing the gas through channels and introducing the beans at the bottom thereof in accordance with the present invention, no such pressure differentials are encountered or need be compensated for.

Roaster outlet 90 directs air to a separator where the chaff or suspended material is removed and the gas reheated and again circulated through the roaster. Nothing in the way of treatment need be done to the recirculating gases other than physical removal of the suspended material.

After roasting to the desired degree, the coffee is preferably discharged into a cooling chamber, where heat exchange between the beans and a cooling medium may be effected in any suitable manner. For example, cooling air may be passed up through the coffee in the manner of a fluidized bed; the beans may be circulated at high velocity as in the roasting chamber illustrated in FIGURE 1; or the beans may be conveyed on a belt, and the air passed over the beans and the hot air removed by convection. In any event, the cooling is preferably carried out under pressure substantially the same as the roasting pressure. The most important reason for pressurized cooling is to avoid reducing the pressure while the beans are still at or near their maximum temperature. Excessive weight losses will occur due to the sensible heat in the beans, which can provide the latent heat to vaporize moisture and other volatile constituents if the pressure is too rapidly reduced.

Normally, when beans are roasted under atmospheric pressure conditions, they will expand or puff up. However, beans roasted under pressure, although retaining a larger percentage of their original weight, will not normally expand and will become somewhat harder and therefore slightly more difficult to grind. I have discovered a method of achieving both bean weight retention and production of an expanded or puffed bean. I accomplish this by carrying out the roasting process under pressure as above described; but, soon after or during roasting, momentarily dropping the roasting or cooling pressure (i.e., for a few milliseconds or more), thereby causing the beans to puff up. To maintain the roasting vessel available for roasting a maximum amount of time it is preferable to carry out the puffing operation after removing the beans from the roasting vessel by opening and closing a suitable valve in the cooling chamber.

Figure 12:
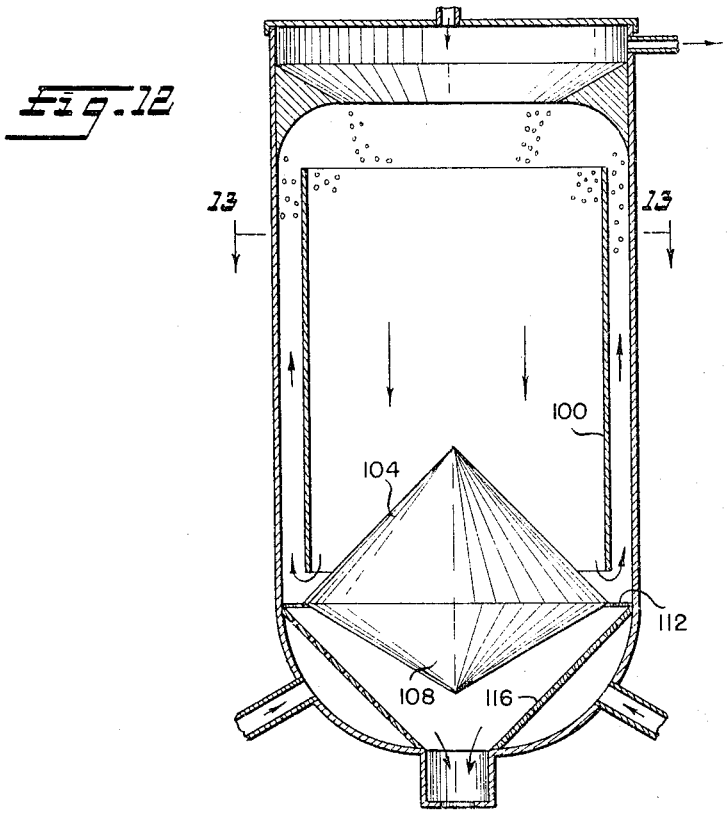
FIGURE 12 is a front elevation view in section of another roasting vessel constructed in accordance with a modification of the present invention.
Figure 13:
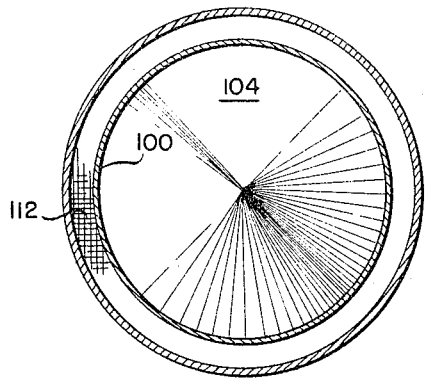
FIGURE 13 is a plan view in section taken along line 13—13 of FIGURE 12.

It is apparent that various modifications of the apparatus for carrying out my invention may be made without departing from the principles of my invention. For example, instead of having a plurality of channels 32, a continuous channel may be formed by providing the roasting vessel with a substantially concentric inner annular partition 100 as shown in FIGURES 12 and 13, the interior of the partition serving as the inner heating and storage zone and the space between the roaster outer body wall and partition serving as the high speed circulation channel. An upper floor cone 104 and a lower deflecting cone 108 regulate the direction of bean movement in the heating zone and inlet air movement respectively. Nozzle assembly 112 and conical member 116 are preferably similar to the corresponding components described in connection with the FIGURE 2 embodiment.

If desired, partitions 32 in FIGURE 2, or partition 100 in FIGURE 12, may be made adjustable vertically with respect to cones 50 or 104, as the case may be, so that the rate of metering of the beans from the storage chamber can be adjusted in accordance with the size of the opening between the channel partition and the upper surface of the floor cones.

Since the coffee in the central heating zone is in contact with the inner surfaces of the partitions 36, it may be desirable to absolutely insure that no burn occurs in the storage zone, for example, where a delicate type of bean or other material is to be roasted. This may be accomplished if desired by constructing the channel partition members hollow to permit circulation of a cooling fluid therein.

As indicated in FIGURE 1 of the drawing, heated air having passed through roasting vessel passes through a chaff separator. A preferred construction of the latter is illustrated in detail in FIGURES 14 and 15. Line 150 is connected with the outlet 90 of the roasting vessel and conveys the outlet gases and chaff tangentially into separating vessel 154. A solid stainless steel baffle 158 is provided in line 150 to deflect the air chaff mixture tangentially of separator vessel 154. An inner separator pipe 162 extends through vessel cover 164 and provides an outlet opening 166. Inner separator pipe 162 extends less than halfway through separator vessel 154. At the bottom of the separator vessel is an outlet conduit 170 which is connected with a polished stainless steel separator cone 174. The cone extends from the bottom of the separator vessel to a point near, but substantially below, the bottom open end of inner separator pipe 162.

In operation, air and chaff tangentially entering the separator vessel centrifugally swirls around the interior, causing the hot air to migrate toward the center and up out inner separator pipe 162 as indicated by the arrows in FIGURE 14. The solid material proceeds down the separator inner wall in a vertical path until it is finally discharged through outlet 170.

Another embodiment of this invention illustrated in FIGURES 16 and 17 involves a continuous coffee roasting apparatus and method. The system for supplying heated air or other gases and a cooling medium to a suitable cooling vessel may be the same as described in connection with the roasting method and apparatus illustrated in FIGURES 1 and 2. The preferred operating conditions are also the same, i.e., pressure about 300 p.s.i. gauge at 400–420° F.

In continuously roasting coffee in accordance with this invention, the coffee is initially delivered to a preliminary storage compartment and subsequently heated by hot rapidly flowing gas in a vertical heating channel. However, instead of returning the coffee to the original storage chamber, it is introduced into another storage compartment and high speed air channel combination; and the cycle is repeated in this manner in successively arranged heating and storage compartments until the roasting is completed.

As shown in FIGURE 16, a compartmented pressure vessel 200 is provided with a central tube 204. The product may be introduced from a suitable charger (not shown) into the upper end of central tube 204 through a rotary valve 208. The latter should preferably be designed to feed the granular product into the pressurized vessel 200 in a continuous stream without disturbing the pressure differential between atmosphere and the vessel interior.

The entering coffee beans emerge from tube 204 through a suitable opening 212 into a storage compartment bordered by a partition 216 and the first vertical high velocity air heating channel 220. The beans fall onto an inclined floor baffle 224, which directs the beans into channel entrance passageway 228 and onto nozzle block 232. The nozzle blocks and nozzles may be of essentially the same construction as illustrated in FIGURES 10 and 11 except that the particular pattern of nozzles in FIGURE 10 will not have the same advantages in the continuous roaster inasmuch as the coffee is being delivered directly from one side onto the nozzle block from the floor baffle 224, rather than from three sides with the aid of the A-roof deflectors as above described.

A partition 236 forms an air inlet plenum 240 with the grounded bottom portion of the roasting vessel 200. The nozzle blocks 232 may be perforated sections in partition 236 or blocks with drilled nozzles secured in place in suitable openings in the partition. An air inlet 244 is provided in the bottom of vessel 200 and is adapted to deliver the air into air plenum 240 at an approximately horizontal angle so that the air will not jet directly into any particular nozzle block, but will become more or less stabilized and pass through each of the nozzle blocks 232 at or near the same pressure.

After entering the first heating channel 220 the coffee is conveyed vertically and heated in the manner described in connection with the embodiment illustrated in FIGURE 2 above. The beans are then deflected by curved perforated baffle 248 into a secondary heating and storage compartment 252 where they are collected on a tilted floor baffle and delivered to the next heating channel 256. This cycle is repeated through heating channels 260, 264, and 268, which is the last vertical heating channel. From heating channel 268 the beans are deflected downwardly by a curved deflector 248 into a discharge compartment comprised of a suitably inclined floor baffle 272 which directs the roasted beans into an opening 276 in central tube 204. Opening 276 is located below central tube inlet opening 212 and below a partition (not shown) in the tube separating inlet 212 from opening 276. After passing through outlet opening 276 into the lower portion of central tube 204 the beans are again passed through a pressurized rotary valve 280 and to a cooling apparatus, which may be a continuous type apparatus similar in construction to the roasting vessel illustrated in FIGURE 16 or any other suitable type cooling apparatus, operated preferably under pressure as decribed above. The heated air emerging from the vertical heating chambers exits from the pressure vessel through outlet 284. The construction design of the cooling apparatus is not as important as the roasting apparatus; but should, in the continuous process, be capable of cooling to the necessary temperature at least as fast as the roaster can produce the roasted product.

While the drawing and description of the continuous process specifically relate to coffee roasting, it is apparent that the roasting apparatus illustrated in FIGURE 16 can be used to heat treat other products, using air or gas, especially if a controlled pressure condition is desirable.

In FIGURES 18 and 19 an alternate construction for a continuous coffee roasting apparatus is illustrated to permit heating in the storage compartments between the vertical high gas velocity heating channels in addition to the heating carried out in the latter. This is affected by perforating floor baffle 300 in the storage compartment and admitting a controlled or predetermined amount of gas or air into the storage compartments through air ports 304 in partition 308. Flow of the air is preferably regulated by single preset dampers 312 over each air port 304. In actual practice, however, the air passing through ports 304 may be adjusted by using individual valving with stems extending outside the vessel; or a mechanism similar to that used for opening the nozzle blocks in the FIGURE 2 embodiment may be utilized to manipulate the dampers.

FIGURE 20 illustrates still another embodiment of the present invention adapted for continuous roasting or otherwise heat treating granular products and is particularly suited for processes in which it is not essential or deemed desirable to roast or heat treat under pressure. The principles of operation are essentially the same as in the embodiment of the invention illustrated in FIGURES 16 and 17 in that the granular product is introduced through a feeding hopper into a storage compartment and subsequently heated in alternate, vertical, high velocity air channels and storage compartments.

As shown in FIGURE 20, a feeding hopper 350 is provided for the introduction of the granular material into the first storage compartment 354. A feeder reel 358 is provided if desired to insure uniform distribution of the granular product in the compartment. However, the reel is not necessary when the roaster is not operating under superatmospheric conditions. As illustrated, the granular material falls onto a perforated floor baffle 362 in compartment 354, which deflects the material laterally over nozzle blocks 366. Air jetting upwardly from the nozzles in nozzle block 366 carries the granular material upwardly until it is deflected by a perforated metal hood deflector 370 into the next storage compartment; and the cycle is repeated as many times as there are vertical heating channels provided, depending upon operating temperature pressure and the material being treated and the extent of heating desired.

After being deflected into the last storage compartment at the end of the apparatus the granular material is discharged through a discharge reel 374 and outlet 378.

The hot air for heating the granular material is preferably supplied by a blower 382 having a suitable vent 386 controlled by a damper 390 to regulate the amount of fresh air, if any, desired in the heating air. A suitable heater 394 is provided to heat the air, and hot air duct 396 conveys the air into a plenum chamber 400 which extends the full length of the heating apparatus. Openings 404 provided underneath each floor baffle 362 and regulated by slidable damper 408 admit air to the underside of each perforated floor baffle 362 to preliminarily heat the granular material in the storage compartments if desired. This effects a substantial increase in the efficiency of heating in the subsequent high velocity air channel. The plenum 400 is also in communication with the underside of the nozzle blocks 366 and supplies the heated gas which is jetted upwardly by the nozzles into the vertical heating channels.

At atmospheric pressure the apparatus illustrated in FIGURE 20, in addition to being well suited for coffee roasting, may also be adapted for drying or otherwise heating materials such as wheat, corn, or other granular products requiring controlled heating.

In drying corn, wheat, and the like, the basic operation of heating would be the same except that the heated air supply for heating the product will be recirculated through an exhaust duct 412 into the inlet side of blower 382, as illustrated, during which circulation a certain percentage of moisture laden air will be discharged and an equal amount of fresh air introduced into the system in order to maintain a fixed moisture content of the air used for drying. Heated air percolating up to the mass of product in the transit storage bins will further aid in drying, although most of the heat will be imparted to the discrete granular particles in the rapid traverse of the vertical heating channels. The rate of heating may be sufficiently high that the surface of the particles will be heated at a rate much faster than heat could be conducted into the center of the individual particles. The height of the conveying channels and the temperature of the heating air may be adjusted so that surface damage to the product will not occur from overheating. While the product is in a transit storage compartment the heat will have an opportunity of equalizing and flowing to the center of the particles. The advantage of the dwell in movement of the product in the storage compartments is that the heat will flow from the surface to the center of each particle, and more heat can be added to the product in the heating channels at a rate much faster than heat could be conducted to the center of the particles.

A further embodiment of the present invention, involving roasting of individual beans, is diagrammatically illustrated in FIGURE 21. Instead of circulating the beans in high velocity gas streams, they may be roasted under pressure in a very thin layer substantially one bean thick. This method may result in good roasting in as little as about 2–3 minutes.

I have found generally pressurizing will produce better results, the pressure being varied from 150 to 300 p.s.i. or more, if desired, depending upon the extent to which moisture and volatile loss from the beans is desired to be controlled. The optimum roasting temperature in this as well as in the roaster illustrated in FIGURE 2 is 400–420° F. when roasting under pressures higher than the boiling point of water, for example 300 p.s.i. There is practically no loss of water vapor from the beans although there is usually a small loss of weight which is probably due to loss of volatiles liberated by chemical reaction brought about by the roasting process.

In the FIGURE 21 embodiment, raw green coffee beans are placed in hopper 480 and passed through a valve 482 into a vessel 486 while valve 488 is closed. If air is to be used, vessel 486 is pressurized to approximately the pressure of the main roasting chamber 490. However, if it is desired to eliminate air and use an inert gas, valve 492 can be connected to a vacuum source and air from vessel 486 pumped out. Upon closing valve 492, valve 494, connected to a source of inert gas such as nitrogen under pressure at least equal to or greater than the pressure in the main roasting chamber 490, can be opened and vessel 486 pressurized. Thereafter, valve 488 is opened, and the beans are batch fed into feeder bin 496. Valve 488 is then closed and valve 492 opened to vent vessel 486 for receiving a new charge of green beans from hopper 480. Duplicate vessels 486 and accompanying valves are shown in the diagram so that, if it is necessary to meet high production rates, vessels 486 can be alternately used, one being charged while the other is being discharged and the procedure reversed. The pressurized beans fed into feeder bin 496 contact a weight sensing element 498 which regulates the feeding of pressurized beans through valves 488 into bin 496 to maintain a minimum weight in bin 496.

From the weight sensing element and feeder bin the beans gravimetrically pass down ramp 499 to a vibratory feeder 500. The latter feeds the beans onto conveyor belt 504 in a very thin layer, preferably substantially one bean thick. Any suitable vibratory feeder may be utilized; however, it has been found that an especially good one is the Model F–O Vibra-Flow Syntron Feeder. A number of other companies also manufacture suitable feeders. The conveyor belt passes through a pair of radiators 506 and 508 preferably spaced approximately the same distance on opposite sides of the belt. These radiators, for best results, are operated at surface temperatures sufficient to heat the beans between 400 and 420° F. under the particular operating pressure. The radiators are preferably hollow or channelled platens through which a high boiling point heat exchange fluid may be circulated. By using a high boiling heat exchange liquid such as Aroclor 1248 instead of steam, it is possible to develop the relatively high temperatures desired by radiation without using high pressure platens or radiators necessary for withstanding extremely high internal steam pressures. Any suitable arrangement for circulating the heating fluid through the radiators may be employed. One such system is disclosed in my copending application Serial No. 166,182 filed January 15, 1962, now Patent No. 3,231,985, and entitled Heating, Drying and Curing Apparatus and Methods. By locating radiator elements on opposite sides of the conveyor belt, which is preferably a wire mesh belt or any other suitable radiation transparent belt, the beans are substantially uniformly heated on all sides as they pass between the radiators. The wire mesh is of such a size that the beans cannot pass through the belt onto the radiators, the mesh size being selected according to the smallest size bean and also the smallest size the beans will attain in a pressurized roasting system due to shrinkage to prevent the beans from falling through.

Conveyor belt 504 discharges the beans onto a second belt 510 which passes the beans through radiators 512 and 514 to hopper 518 and a rotary valve 520, which meters the beans into a cooling system. When the beans are roasted under pressure, as previously pointed out, it is desirable to also cool them under pressure. Otherwise, if the beans were passed out of the highly pressurized chamber while still hot, the moisture in the beans would flash into steam, thereby causing excessive loss of moisture and volatiles.

The cooling chamber 524 is isolated by partition means (preferably thermally insulated) from the roasting zone, but is located within roaster 490 and therefore under substantially the same pressure. Rotary valve 520 is provided to prevent the cold air from being released into the roasting area. As the hot roasted beans are passed onto a conveyor 528 in the cooling zone, a fine mist or fog of water is supplied from line 532 and nozzles 536. The second half of the cooling is by air distributed through hood 540 through line 544 from cooler 548. A recirculation line 552 with blower 556 is provided to return the air to the cooler. Any suitable cooler may be used; however, since the cooling air will be at the pressure of roaster 490 which may be 300 p.s.i. for example, all of the air in the cooling circuit will be under high pressure; and a barometric or jet condenser cooler is therefore preferred.

The cooled beans are discharged from belt 528 after passing through the cooling phases into a receiving vessel 560. The receiving vessel is placed in service by closing valves 564 and 568, pressurizing the receiving vessel to the pressure in roaster 490 by means of a pressure source connected to valve 572. Valve 564 is then opened, and deflector 576 causes the cooled beans to flow into vessel 560. Thereafter, valve 564 is closed and vent valve 580 opened to atmospheric pressure and valve 568 opened and the contents of vessel 560 discharged. Receiver vessel 560 is duplicated so that the discharge from the conveyor can be continuous in accordance with the continuous introduction of beans into the roaster through duplicate vessels 486.

Instead of using radiant heat very successful results have been obtained by using steam at 300 pounds pressure in the roaster chamber. The heat transfer from the steam into the beans is excellent, and roasting is therefore very fast and completely uniform because the beans get exactly the same heat treatment. When steam is used as the heating medium it is desirable to dry the final product under mild drying conditions since the beans will absorb some moisture.

Good results have also been achieved by attaching a vibrating machine to the conveyor belts in the roaster shown in FIGURE 21. By regulating the amplitude of vibrations the beans can be controlled to hop very slightly or simply to rotate in the wire mesh belt so that an even more uniform heat application is achieved.

The advantage of radiant heat is that the beans are capable of absorbing radiant energy and developing heat therein efficiently and to desirable depth, thus readily avoiding the heat retarding effect of the cool layer of atmospheric gases surrounding each bean prior to, and during, entrance into the roaster.

Two conveyor belts have been illustrated in FIGURE 21; however, it is apparent that a single belt or a larger number of belts could be used, if desired, depending upon the speed of their operation and the time required for roasting at the operating temperature of the radiators.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An apparatus for roasting coffee beans and the like, comprising: a vessel having spaced outer peripheral and inner wall members defining a roasting chamber; means in said chamber defining annularly spaced, upwardly directed channels for the product being roasted, all of said channels communicating at their upper ends with the space between them and said inner wall member; an annular nozzle member in the space between said outer peripheral and inner wall members adjacent their lower ends and having annularly and radially spaced nozzles surrounding said inner wall member for directing heated roasting fluid upwardly at a sufficiently high velocity to entrain the product being roasted; means for delivering heated roasting fluid simultaneously to all of said nozzles under substantially uniform pressure, the nozzles in said nozzle member being too small to permit the passage therethrough of the articles being roasted.

2. An apparatus for roasting coffee beans and the like, comprising: a vessel having spaced outer peripheral and inner wall members defining a roasting chamber; means in said chamber defining annularly spaced, upwardly directed channels for the product being roasted, all of said channels communicating at their upper ends with the space between them and said inner wall member; an annular nozzle member in the spaced between said outer and inner wall members adjacent their lower ends, said nozzle member having annularly spaced sections underlying said channels and annularly and radially spaced nozzles surrounding said inner wall member for directing heated roasting fluid upwardly at a sufficiently high velocity to entrain the product being roasted, the nozzles in said nozzle member being sufficiently small to prevent the passage therethrough of the articles being roasted and said inner wall member comprising means having an upper surface that slopes downwardly and outwardly toward said nozzle member to direct the product being roasted into the path of the heated fluid discharging from said nozzle member; deflectors between and below each pair of adjoining channels to guide the product being roasted toward the annularly spaced sections of said nozzle member; and means for delivering heated roasting fluid simultaneously to all of said nozzles under substantially uniform pressure.

3. In the apparatus described in claim 1, said inner wall member and said nozzle member being movable with respect to each other to provide a passageway for the discharge of roasted products; and means for moving one with respect to the other.

4. In the apparatus described in claim 1, said inner wall member comprising means having an upper surface that slopes downwardly and outwardly toward said nozzle member to direct the product being roasted into the path of the heated roasting fluid discharging from the nozzles in said nozzle member.

5. In the apparatus described in claim 1, said inner wall member and said nozzle member being movable with respect to each other to provide a passageway for the discharge of roasted products; and means for moving one with respect to the other.

6. In the apparatus described in claim 1, means defining a plenum chamber beneath said nozzle member and in communication with the nozzles in said nozzle member, and means for admitting heated roasting fluid at a substantially equal pressure throughout said plenum chamber for passage through the nozzles in said nozzle member.

7. In the apparatus described in claim 2, said nozzle member being discontinuous between said annularly spaced sections to provide gaps therebetween; and means for rotating said nozzle member to locate said gaps beneath said channels in order to discharge the roasted product.

8. In the apparatus described in claim 1, said inner wall member being conical and terminating at a lower edge adjoining said nozzle member.

References Cited by the Examiner

UNITED STATES PATENTS

| | | | |
|---|---|---|---|
| 260,567 | 7/1882 | Hawkenson | 99—238 |
| 603,551 | 5/1898 | Burs | 99—236 |
| 2,118,078 | 5/1938 | Flugel | 34—10 |
| 2,343,780 | 3/1944 | Lewis | 34—57 X |
| 2,609,185 | 9/1952 | Eisner | 259—4 |
| 2,649,358 | 8/1953 | Palmer | 34—10 X |
| 2,666,269 | 1/1954 | Parry | 263—21 X |
| 2,668,649 | 2/1954 | Clark et al. | 99—238.5 X |
| 2,806,744 | 9/1957 | Hall et al. | 259—4 X |
| 2,884,230 | 4/1959 | Pyle et al. | 34—57 X |
| 3,024,500 | 3/1962 | Lawson | 259—4 X |
| 3,097,828 | 7/1963 | Grun | 259—4 |
| 3,128,690 | 4/1964 | Maehl | 99—238 |
| 3,149,976 | 9/1964 | Smith | 99—236 X |

FOREIGN PATENTS

| | | |
|---|---|---|
| 814,756 | 6/1959 | Great Britain. |

WALTER A. SCHEEL, *Primary Examiner.*

C. I. COUGHENOUR, *Assistant Examiner.*